United States Patent
Kato et al.

(10) Patent No.: US 6,876,541 B1
(45) Date of Patent: Apr. 5, 2005

(54) ALUMINUM MATERIAL FOR ELECTRODE OF ELECTROLYTIC CAPACITOR AND METHOD FOR PRODUCING ALUMINUM FOIL FOR ELECTRODE OF ELECTROLYTIC CAPACITOR, AND ELECTROLYTIC CAPACITOR

(75) Inventors: Taro Kato, Kyoto (JP); Akira Koyama, Kyoto (JP); Masato Akao, Kyoto (JP); Tadao Fujihira, Sakai (JP); Tomoaki Yamanoi, Sakai (JP); Jin Zhang, Sakai (JP)

(73) Assignees: Nichicon Corporation, Kyoto (JP); Showa Denko K.K., Tokyo (JP)

( * ) Notice: Subject to any disclaimer, the term of this patent is extended or adjusted under 35 U.S.C. 154(b) by 59 days.

(21) Appl. No.: 10/380,478

(22) PCT Filed: Sep. 20, 2001

(86) PCT No.: PCT/JP01/08170

§ 371 (c)(1),
(2), (4) Date: Aug. 5, 2003

(87) PCT Pub. No.: WO02/27052

PCT Pub. Date: Apr. 4, 2002

(30) Foreign Application Priority Data

Sep. 20, 2000 (JP) ........................................ 2000-284836

(51) Int. Cl.$^7$ .................................................. H01G 9/00
(52) U.S. Cl. ........................ 361/523; 361/516; 361/519; 361/525; 361/528; 361/529; 29/25.03
(58) Field of Search ................................. 361/523, 516, 361/519, 520, 525, 528, 529, 530, 508, 509, 511, 512; 252/62.2; 29/25.03

(56) References Cited

U.S. PATENT DOCUMENTS

| | | | | |
|---|---|---|---|---|
| 4,510,207 A | * | 4/1985 | Mehada et al. | 428/607 |
| 5,731,106 A | * | 3/1998 | Tsutsumi et al. | 429/332 |
| 6,291,107 B1 | * | 9/2001 | Shimizu | 429/324 |
| 6,767,671 B2 | * | 7/2004 | Itagaki et al. | 429/328 |

FOREIGN PATENT DOCUMENTS

| | | |
|---|---|---|
| JP | 53-114059 | 10/1978 |
| JP | 2-270928 | 11/1990 |
| JP | 5-5145 | 1/1993 |
| JP | 10-140276 | 5/1998 |

* cited by examiner

Primary Examiner—Chau N. Nguyen
Assistant Examiner—Nguyen T. Ha
(74) Attorney, Agent, or Firm—Oblon, Spivak, McClelland, Maier & Neustadt, P.C.

(57) ABSTRACT

An aluminum material for electrolytic capacitor electrodes, the aluminum material having aluminum purity of 99.9% or more, consisting of: Si: 2 to 50 ppm; Fe; 2 to 50 ppm; Cu: 15 to 150 ppm; Zn: 1 to 80 ppm; Pb: 0.1 to 3 ppm; at least one of Zr and V: 11 ppm or more, a total content of the at least one of Zr and V being 11 to 100 ppm; and the balance being Al and impurities, wherein a content of B is controlled to be 2 ppm or less. In the aluminum material, Ti: 1 to 30 ppm, Mn group composition (at least one of Mn, Ga, Mg and Ca): 1 to 50 ppm in total, and In group composition (at least one of In, Sn, Sb): 1 to 30 ppm in total are selectively added. A method for manufacturing an aluminum foil for electrolytic capacitor electrodes according to the present invention, comprises the steps of: rolling the aforementioned aluminum material into a foil; and performing final annealing of the foil at the temperature of 430 to 580° C.

54 Claims, No Drawings

ALUMINUM MATERIAL FOR ELECTRODE OF ELECTROLYTIC CAPACITOR AND METHOD FOR PRODUCING ALUMINUM FOIL FOR ELECTRODE OF ELECTROLYTIC CAPACITOR, AND ELECTROLYTIC CAPACITOR

TECHNICAL FIELD

The present invention relates to an aluminum material for electrolytic capacitor electrodes, a method for manufacturing an aluminum foil for electrolytic capacitor electrodes, and an electrolytic capacitor.

BACKGROUND ART

In accordance with the recent miniaturization of electronics devices, it is required to increase electric capacitance of an aluminum foil for electrolytic capacitor electrodes to be built in electronics devices.

In general, an aluminum material for electrolytic capacitor electrodes is subjected to etching treatment in order to increase the surface expansion ratio of the aluminum material to thereby increase the electric capacitance. The deeper the depth of etching pit formed by etching treatment is, the higher the surface expansion ratio becomes. Therefore, various proposals for improving etching characteristics have been made. For example, regarding manufacturing steps, various treatments, such as degreasing washing treatment before final annealing, hydration treatment before final annealing and crystalline oxide film forming treatment at the final annealing or oxidation treatment before final annealing, have been proposed (see Japanese Examined Laid-open Patent Publication No. S58-34925, Japanese Unexamined Laid-open Patent Publication No. 3-122260, etc.). Furthermore, regarding compositions, there have been proposed to slightly add elements such as Pb or Bi or to add elements such as Ti, Zr and/or V to thereby make these elements condense in the surface layer of the aluminum material (Japanese Unexamined Laid-open Patent Publication No. 4-62822). Furthermore, regarding a crystal structure, there has been proposed to adjust the (100) crystal orientation.

However, merely increasing the depth of each etching pit was not enough to improve the surface expansion ratio of the aluminum foil. In order to further increase the surface expansion ratio, it is necessary to generate etching pits uniformly on the etching surface with high density by decreasing local etching, un-etching and surface dissolution. According to the aforementioned various methods and/or compositions, it was not enough to generate etching pits uniformly with high density. Therefore, the aforementioned methods and/or compositions do not meet requests of increasing electric capacitance.

DISCLOSURE OF INVENTION

In view of the aforementioned technical background, the present invention is to provide an aluminum material for electrolytic capacitor electrodes, a method for manufacturing an aluminum foil for electrolytic capacitor electrodes and an electric capacitor which can further increase the electric capacitance by generating deep etching pits uniformly with high density to increase the surface expansion ratio certainly.

In this specification, the wording of "aluminum" defines and includes aluminum and its alloys.

In order to attain the aforementioned objects, the present invention proposes an aluminum material for electrolytic capacitor electrodes comprising specific compositions, a method for manufacturing an aluminum foil for electrolytic capacitor electrodes made of aluminum comprising specific compositions, and an electrolytic capacitor using an aluminum foil comprising the specific compositions as an electrode.

According an aluminum material for electrolytic capacitor electrodes as recited in claims 1 and 2, the aluminum material has aluminum purity of 99.9% or more and consists of: Si: 2 to 50 ppm; Fe: 2 to 50 ppm; Cu: 15 to 150 ppm; Zn: 1 to 80 ppm; Pb: 0.1 to 3 ppm; at least one of Zr and V: 11 ppm or more, wherein the total content of the at least one of Zr and V is 11 to 100 ppm; and the balance being Al and impurities, wherein a content of B is controlled to be 2 ppm or less.

In the aforementioned aluminum material for electrolytic capacitor electrodes, it is preferable that the Si content is 5 to 20 ppm, the Fe content is 5 to 20 ppm, the Cu content is 30 to 100 ppm, the Zn content is 10 to 50 ppm, the Pb content is 0.3 to 2 ppm, the content of the at least one of Zr and V is 20 ppm or more, the total content of the at least one of Zr and V is 20 to 70 ppm, and wherein the B content is 1 ppm or less.

According the aluminum material for electrolytic capacitor electrodes as recited in claims 3 to 5, the aluminum material has aluminum purity of 99.9% or more and consists of: Si: 2 to 50 ppm; Fe: 2 to 50 ppm; Cu: 15 to 150 ppm; Zn: 1 to 80 ppm; Pb: 0.1 to 3 ppm; at least one of Zr and V is 11 ppm or more, wherein the total content of the at least one of Zr and V is 11 to 100 ppm; Ti: 1 to 30 ppm; and the balance being Al and impurities, wherein a content of B is controlled to be 2 ppm or less.

In the aforementioned aluminum material for electrolytic capacitor electrodes, it is preferable that the Si content is 5 to 20 ppm, the Fe content is 5 to 20 ppm, the Cu content is 30 to 100 ppm, the Zn content is 10 to 50 ppm, the Pb content is 0.3 to 2 ppm, the content of the at least one of Zr and V is 20 ppm or more, the total content of the at least one of Zr and V is 20 to 70 ppm, and wherein the B content is 1 ppm or less.

Furthermore, it is preferable that the Ti content is 5 to 20 ppm.

According to the aluminum material for electrolytic capacitor electrodes as recited in claims 6 to 8, the aluminum material has aluminum purity of 99.9% or more and consists of: Si: 2 to 50 ppm; Fe: 2 to 50 ppm; Cu: 15 to 150 ppm; Zn: 1 to 80 ppm; Pb: 0.1 to 3 ppm; at least one of Zr and V is 11 ppm or more, wherein the total content of at least one of Zr and V is 11 to 100 ppm; at least one of Mn, Ga, Mg and Ca is 1 ppm or more, wherein the total content of the at least one of Mn, Ga, Mg and Ca is 1 to 50 ppm; and the balance being Al and impurities, wherein a content of B is controlled to be 2 ppm or less.

In the aforementioned aluminum material for electrolytic capacitor electrodes, it is preferable that the Si content is 5 to 20 ppm, the Fe content is 5 to 20 ppm, the Cu content is 30 to 100 ppm, the Zn content is 10 to 50 ppm, the Pb content is 0.3 to 2 ppm, the content of the at least one of Zr and V is 20 ppm or more, the total content of the at least one of Zr and V is 20 to 70 ppm, and the B content is 1 ppm or less. Furthermore, it is preferable that the content of the at least one of Mn, Ga, Mg and Ca is 3 ppm or more and the total content of the at least one of Mn, Ga, Mg and Ca is 3 to 30 ppm.

According to the aluminum material for electrolytic capacitor electrodes as recited in claims 9 to 11, in chemical composition, the aluminum material has aluminum purity of 99.9% or more and consists of: Si: 2 to 50 ppm; Fe: 2 to 50 ppm; Cu: 15 to 150 ppm; Zn: 1 to 80 ppm; Pb: 0.1 to 3 ppm; at least one of Zr and V: 11 ppm or more, wherein the total content of the at least one of Zr and V is 11 to 100 ppm; at least one of In, Sn and Sb: 1 ppm or more, wherein the total content of the at least one of In. Sn and Sb is 1 to 30 ppm; and the balance being Al and impurities, wherein a content of B is controlled to be 2 ppm or less.

In the aforementioned aluminum material for electrolytic capacitor electrodes, it is preferable that the Si content is 5 to 20 ppm, the Fe content is 5 to 20 ppm, the Cu content is 30 to 100 ppm, the Zn content is 10 to 50 ppm, the Pb content is 0.3 to 2 ppm, the content of the at least one of Zr and V is 20 ppm or more and the total content of the at least one of Zr and V is 20 to 70 ppm, and wherein the B content is 1 ppm or less. Furthermore, it is preferable that the content of the at least one of In, Sn and Sb is 2 ppm or more and the total content of the at least one of In, Sn and Sb is 2 to 15 ppm.

According to the aluminum material for electrolytic capacitor electrodes as recited in claims 12 to 16, in chemical composition, the aluminum material has aluminum purity of 99.9% or more and consists of: Si: 2 to 50 ppm; Fe: 2 to 50 ppm; Cu: 15 to 150 ppm; Zn: 1 to 80 ppm; Pb: 0.1 to 3 ppm; at least one of Zr and V: 11 ppm or more, wherein the total content of the at least one of Zr and V is 11 to 100 ppm; Ti: 1 to 30 ppm; at least one of Mn, Ga, Mg and Ca: 1 ppm or more, wherein the total content of the at least one of Mn, Ga, Mg and Ca is 1 to 50 ppm; and the balance being Al and impurities, wherein a content of B is controlled to be 2 ppm or less.

In the aforementioned aluminum material for electrolytic capacitor electrodes, it is preferable that the Si content is 5 to 20 ppm, the Fe content is 5 to 20 ppm, the Cu content is 30 to 100 ppm, the Zn content is 10 to 50 ppm, the Pb content is 0.3 to 2 ppm, the content of the at least one of Zr and V is 20 ppm or more, the total content of the at least one of Zr and V is 20 to 70 ppm, and wherein the B content B is 1 ppm or less. Furthermore, it is preferable that the Ti content is 5 to 20 ppm. Furthermore, it is preferable that the content of the at least one of Mn, Ga, Mg and Ca is 3 ppm or more and the total content of the at least one Mn, Ga, Mg and Ca is 3 to 30 ppm.

According to the aluminum material for electrolytic capacitor electrodes as recited in claims 17 to 21, in chemical composition, the aluminum material has aluminum purity of 99.9% or more and consists of: Si: 2 to 50 ppm; Fe: 2 to 50 ppm; Cu: 15 to 150 ppm; Zn: 1 to 80 ppm; Pb: 0.1 to 3 ppm; at least one of Zr and V: 11 ppm or more, wherein a total content of the at least one of Zr and V is 11 to 100 ppm; Ti: 1 to 30 ppm; at least one of In, Sn and Sb: 1 ppm or more, wherein a total content of the at least one on In, Sn and Sb is 1 to 30 ppm; and the balance being Al and impurities, wherein a content of B is controlled to be 2 ppm or less.

In the aforementioned aluminum material for electrolytic capacitor electrodes, it is preferable that the Si content is 5 to 20 ppm, the Fe content is 5 to 20 ppm, the Cu content is 30 to 100 ppm, the Zn content is 10 to 50 ppm, the Pb content is 0.3 to 2 ppm, the content of the at least one of Zr and V is 20 ppm or more, the total content of the at least one of Zr and V is 20 to 70 ppm, and wherein the B content is 1 ppm or less. Furthermore, it is preferable that the content of Ti is 5 to 20 ppm. Furthermore, it is preferable that the content of the at least one of In, Sn and Sb is 2 ppm or more and the total content of the at least one of In, Sn and Sb is 2 to 15 ppm.

According to the aluminum material for electrolytic capacitor electrodes as recited in claims 22 to 26, in chemical composition, the aluminum material has aluminum purity of 99.9% or more and consists of: Si: 2 to 50 ppm; Fe: 2 to 50 ppm; Cu: 15 to 150 ppm; Zn: 1 to 80 ppm; Pb: 0.1 to 3 ppm; at least one of Zr and V: 11 ppm or more, wherein a total content of the at least one of Zr and V is 11 to 100 ppm; at least one of Mn, Ga, Mg and Ca: 1 ppm or more, wherein the total content of the at least one of Mn, Ga, Mg and Ca is 1 to 50 ppm; at least one of In, Sn and Sb: 1 ppm or more, wherein a total content of the at least one of In, Sn and Sb is 1 to 30 ppm; and the balance being Al and impurities, wherein a content of B is controlled to be 2 ppm or less.

In the aforementioned aluminum material for electrolytic capacitor electrodes, it is preferable that the Si content is 5 to 20 ppm, the Fe content is 5 to 20 ppm, the Cu content is 30 to 100 ppm, the Zn content is 10 to 50 ppm, the Pb content is 0.3 to 2 ppm, the content of the at least one of Zr and V is 20 ppm or more, a total content of the at least one of Zr and V is 20 to 70 ppm, and wherein the B content is 1 ppm or less.

Furthermore, it is preferable that the content of at least one of Mn, Ga, Mg and Ca is 3 ppm or more, and a total content of the at least one of Mn, Ga, Mg and Ca is 3 to 30 ppm. Furthermore, it is preferable that the content of at least one of In, Sn and Sb is 2 ppm or more, and the total content of the at least one of In, Sn and Sb is 2 to 15 ppm.

According to the aluminum material for electrolytic capacitor electrodes as recited in claims 27 to 38, in chemical composition, the aluminum material has aluminum purity of 99.9% or more and consists of: Si: 2 to 50 ppm; Fe: 2 to 50 ppm; Cu: 15 to 150 ppm; Zn: 1 to 80 ppm; Pb; 0.1 to 3 ppm; at least one of Zr and V: 11 ppm or more, wherein a total content of the at least one of Zr and V is 11 to 100 ppm; Ti: 1 to 30 ppm; at least one of Mn, Ga, Mg and Ca: 1 ppm or more, wherein the total content of the at least one of Mn, Ga, Mg and Ca is 11 to 50 ppm; at least one of In, Sn and Sb: 1 ppm or more, wherein the total content of the at least one of In, Sn and Sb is 1 to 30 ppm; and the balance being Al and impurities, wherein a content of B is controlled to be 2 ppm or less.

In the aforementioned aluminum material for electrolytic capacitor electrodes, it is preferable that the Si content is 5 to 20 ppm, the Fe content is 5 to 20 ppm, the Cu content is 30 to 100 ppm, the Zn content is 10 to 50 ppm, the Pb content is 0.3 to 2 ppm, the content of the at least one of Zr and V is 20 ppm or more, the total content of the at least one of Zr and V is 20 to 70 ppm, and wherein the B content is 1 ppm or less. Furthermore, it is preferable that the Ti content is 5 to 20 ppm. Furthermore, it is preferable that the content of at least one of Mn, Ga, Mg and Ca is 3 ppm or more and a total content of the at least one of Mn, Ga, Mg and Ca is 3 to 30 ppm. Furthermore, it is preferable that the content of at least one of In, Sn and Sb is 2 ppm or more and a total content of the at least one of In, Sn and Sb is 2 to 15 ppm.

According to the method for manufacturing an aluminum foil for electrolytic capacitor electrodes as recited in claims 39 to 46 is a method for manufacturing a foil using the aluminum material having the chemical compositions corresponding to claims 1, 3, 6, 9, 12, 17, 22 and 27.

That is, after rolling an aluminum material into a foil, the foil is subjected to final annealing at the temperature of 430 to 580° C.

According to the electrolytic capacitor as recited in claims 47 to 54, at least one of an anode and a cathode is made of an aluminum material corresponding to claims 1, 3, 6, 9, 12, 17, 22 and 27.

In the chemical composition of the aluminum material for the aforementioned electrolytic capacitor electrodes, the common elements to be added to high purity aluminum in a controlled manner is eight elements including Si, Fe, Cu, Zn and Pb, Zr and/or V, and B whose content is to be controlled. In the aluminum material according to claims 1 and 2, only these common elements are added. In the aluminum material according to claims 3 to 38, these common elements and one or more elements selected from the group consisting of Ti, Mn group (Mn, Ga, Mg, Ca) and In group (In, Sn, Sb) are added.

The reasons for adding each of the aforementioned elements and the reasons for limiting the content of each of the aforementioned elements are as follows.

The reasons for controlling the purity of aluminum as a base material to be 99.9% or more are as follows. If the purity is less than 99.9%, the content of impurities becomes too much. Accordingly, even if the content of elements to be slightly added is controlled, excessive dissolution will easily occur at the time of etching, which in turn deteriorates etching characteristics. The preferable aluminum purity is 99.98% or more.

Si, Fe, Cu, Zn and Pb are essential elements of all of the aluminum materials according to claims 1 to 38.

Si has an effect of preventing crystal grains from growing at the time of recrystallization. If the content is less than 2 ppm, the aforementioned effects become poor. To the contrary, if the content exceeds 50 ppm, the generation distribution of etching pits becomes uneven. Accordingly, the content should be controlled to be 2 to 50 ppm. The preferable lower limit of the Si content is 5 ppm, and the preferable upper limit thereof is 20 ppm.

Fe is an element inevitable included in aluminum. If a large amount of Fe is included, Al—Fe series deposits will be formed depending on the final annealing temperature, the amount of dissolution will increase excessively, and the generation distribution of etching pits becomes uneven. If the Fe content exceeds 50 ppm, Al—Fe series deposits are easily formed. Controlling the Fe content to be less than 2 ppm is disadvantage in refining cost. Therefore, the Fe content should be 2 to 50 ppm. The preferable lower limit of the Fe content is 5 ppm, and the preferable upper limit thereof is 200 ppm. The most preferable upper limit is 15 ppm.

Cu is an element that contributes to an improvement of etching characteristics. If the Cu content is less than 15 ppm, the effect is poor. To the contrary, if the Cu content exceeds 150 ppm, the formation of cubic orientation in the crystal structure is obstructed, resulting in deteriorated etching characteristics. Accordingly, the Cu content should be controlled to be 15 to 150 ppm. The preferable lower limit of Cu content is 30 ppm, and the preferable upper limit thereof is 100 ppm.

Zn has an effect of uniformly generating etched pits. If the Zn content is less than 1 ppm, the effect is poor. To the contrary, if the Zn content exceeds 80 ppm, excessive surface dissolution occurs, which decreases electric capacitance. Accordingly, the Zn contents should be controlled so as to fall within the range of 1 to 80 ppm. The preferable lower limit of Zn content is 10 ppm, and the preferable upper limit thereof is 50 ppm.

Pb condenses in the foil surface at the time of final annealing, and causes a uniform generation of etching pits at the early stage of etching. If the Pb content is less than 0.1 ppm, the aforementioned effect is poor. To the contrary, if the Pb content exceeds 3 ppm, the foil surface dissolves intensely, which causes a deterioration of electric capacitance. Accordingly, the Pb content should be controlled so as to fall within the range of 0.1 to 3 ppm. The preferable lower limit of Pb content is 0.3 ppm, and the preferable upper limit thereof is 2 ppm.

Zr and V are essential elements to be selectively added, and at least one of them is included in all of the aluminum material according to claims 1 to 38.

Zr and V have an effect of increasing the generation of etching pits, respectively, and the effect can be obtained by adding at least one of them. If the content of at least one of them is less than 11 ppm, the aforementioned effect is poor. To the contrary, if the content thereof in total exceeds 100 ppm, the etching pit distribution becomes uneven. Accordingly, the content of Zr and V should be 20 ppm individually and that the total content thereof should be 11 to 100 ppm. The content of the preferable lower limit of them is 20 ppm individually and the total content of the preferable lower limit thereof is 20 ppm. The total content of the preferable upper limit thereof is 70 ppm.

If B forms compounds together with Zr or V, these compounds may cause local etching pits or excessive dissolution. Therefore, it is preferable that the content of B is as little as possible. In all of the aluminum materials according to claims 1 to 38, the content of B should be controlled to be 2 ppm or less. The content of the preferable upper limit of B is 1 ppm.

Accordingly, controlling the content of aluminum purity and that of each element, Si, Fe, Cu, Zn, Pb, Zr, V and B, enables uniform generation of high density etching pits without causing excessive dissolution at the time of etching, resulting in an increased surface expansion ratio. This increased surface expansion ratio can improve electric capacitance.

Ti has an effect of enhancing generation of etching pits, and is added to the aluminum member according to claims 3 to 5, 12 to 16, 17 to 21 and 27 to 38. If the Ti content is less than 1 ppm, the aforementioned effect is poor. To the contrary, if the Ti content exceeds 30 ppm, grain-boundary etching becomes excessive, casing uneven pit generation. Accordingly, the Ti content should be controlled so as to fall within the range of 1 to 30 ppm. The preferable lower limit of the Ti content is 5 ppm, and the preferable upper limit thereof is 20 ppm.

Therefore, in the aluminum member in which a certain amount of Ti is added, the generation of etching pits can be further enhanced and therefore the surface expansion ratio can be increased.

Mn, Ga, Mg and Ca, which are Mn group elements, have an effect of equalizing the generation distribution of etching pits, and are added to the aluminum material according to claims 6 to 8, 12 to 16, 22 to 26 and 27 to 38. The aforementioned effect can be obtained by adding at least one of these elements. If only one of these elements is added and the content thereof is less than 1 ppm, the aforementioned effect is poor. To the contrary, if the total content of at least one of these elements exceeds 50 ppm, surface dissolution will occur, causing a deterioration of electric capacity. Accordingly, the content of Mn, Ga, Mg and Ca should be 1 ppm or more individually and the total content of them should be 1 to 50 ppm. The preferable lower limit of the content of these elements is 3 ppm individually and in total. The preferable upper limit thereof is 30 ppm in total.

Thus, in the aluminum material to which a certain amount of Mn group elements is added, the etching pit distribution can be further equalized, which can increase the surface expansion ratio.

In, Sn and Sb, which are In-group elements, condense in the foil surface at the time of final annealing, and causes a uniform generation of etching pits at the early stage of etching. Thus, a partial generation of etching pits can be prevented. These elements are added to the aluminum materials according to claims 9 to 11, 17 to 21, 22 to 26 and 27 to 38. The aforementioned effect can be obtained by adding at least one of these elements. If only one of these elements is added and the content thereof is less than 1 ppm, the aforementioned effect is poor. To the contrary, if the total content of at least one of these elements exceeds 30 ppm, excessive surface dissolution will occur, causing a deterioration of electric capacitance. Accordingly, the total content thereof should be 1 to 30 ppm. The preferable lower limit of the content of these elements is 2 ppm individually and in total. The preferable upper limit thereof is 15 ppm in total.

Thus, in the aluminum material including a certain amount of In group elements, the etching pit distribution can be further equalized, which can increase the surface expansion ratio.

The aluminum material for electrolytic capacitor electrodes according to the present invention limits the chemical compositions as electrolytic capacitor electrode materials, and the configuration thereof includes not only a foil obtained by rolling but also a slab before rolling and an intermediate between rolling.

In cases where the aluminum material according to the present invention is a foil, it is preferably manufactured by the method according to the present invention.

That is, in the method for manufacturing the aluminum foil for electrolytic capacitor electrodes, after rolling, final annealing is performed at the temperature of 430 to 580° C. By performing the final annealing under this condition, the cubic orientation of the foil is adjusted, and Pb, In, Sn and Sb are concentrated in the surface portion of the foil. Therefore, the surface expansion ratio can be increased assuredly. The final annealing should be performed at the temperature failing within the range of 430 to 580° C. If the temperature is less than 430° C., Al—Fe series deposits will be generated and the deposits will be etched initially. Accordingly, the generation of pitches becomes uneven. To the contrary, if the temperature exceeds 580° C., adjacent foils adheres. The preferable lower limit of the annealing temperature is 500° C., and the preferable upper limit thereof is 560° C. Furthermore, it is preferable that the annealing is performed in a nonoxide atmosphere such as a vacuum atmosphere or an inert gas atmosphere. Furthermore, the annealing time is preferably 1 to 24 hours, more preferably 4 to 12 hours.

The present invention does not limit the steps before the final annealing, and these steps are performed in accordance with a known method. As typical foil manufacturing steps before the final annealing, steps of manufacturing an aluminum slab having certain compositions, surface cutting, soaking treatment, hot rolling, cold rolling including intermediate annealing, foil rolling and degreasing washing can be exemplified.

Furthermore, in the electrolytic capacitor according to the present invention, since an aluminum foil having specific chemical compositions is employed as electrode materials, high-density etching pits can be formed uniformly, and therefore the surface expansion ratio can be increased.

The electrolytic capacitor according to the present invention includes three types of capacitors, a capacitor in which an anode is formed by the aluminum foil having the aforementioned compositions, a capacitor in which a cathode is formed by the aluminum foil having the aforementioned compositions and a capacitor in which both electrodes are formed by the aluminum foil having the aforementioned compositions. Furthermore, conditions other than chemical compositions of the aluminum foil, such as the foil thickness, the etching method and the chemical-film compositions, are not limited.

BEST MODE FOR CARRYING OUT THE INVENTION

In manufacturing a foil, ingots in which elements shown in Tables 1 and 2 are added to a high-purity aluminum whose aluminum purity is 99.99% were formed by a small book mold. Each of these ingots were rolled into a foil having a thickness of 100 $\mu$m via surface cutting, hot rolling, cold rolling and intermediate annealing by a conventional method. Then, each foil was subjected to final annealing under the condition of 520° C.-5 hours in an inert gas atmosphere after the degreasing washing.

Subsequently, each foil was subjected to a first stage etching of DC electrolysis of 0.2 A/m$^2$ for 100 seconds in a mixed bath containing hydrochloric acid of 5 wt % and sulfuric acid of 20 wt % at 80° C., and then subjected to a second stage chemical etching in the same bath. In the chemical etching, the etching time was adjusted so that the etching dissolution amount becomes 35±1%.

Thereafter, these etched foils were subjected to a conversion treatment of 350 V in boric acid bath of 5%. Then, each of the electric capacitance was measured in a boric acid ammonium of 3 wt %. The measured electric capacitance are shown in Tables 1 and 2 as a relative value in which the electric capacitance of Comparative Example No. 1 is 100%.

TABLE 1

| Example | Chemical composition (ppm) | | | | | | | | | | | | | | | | Electric capacitance (%) |
|---|---|---|---|---|---|---|---|---|---|---|---|---|---|---|---|---|---|
| | Si | Fe | Cu | Zn | Pb | Er | V | B | Ti | Mn | Ga | Mg | Ca | In | Sn | Sb | |
| 1 | 10 | 10 | 40 | 20 | 0.5 | 20 | 1 | 1 | 1 | <1 | <1 | <1 | <1 | <1 | <1 | <1 | 102 |
| 2 | 10 | 10 | 40 | 20 | 0.5 | 70 | 1 | 1 | 1 | <1 | <1 | <1 | <1 | <1 | <1 | <1 | 105 |
| 3 | 10 | 10 | 40 | 20 | 0.5 | 20 | 1 | 1 | 1 | 1 | 1 | 1 | <1 | <1 | <1 | <1 | 103 |
| 4 | 10 | 10 | 40 | 20 | 0.5 | 50 | 1 | 1 | 1 | 1 | 1 | 1 | <1 | <1 | <1 | <1 | 105 |
| 5 | 10 | 10 | 40 | 20 | 0.5 | 70 | 1 | 1 | 1 | 1 | 1 | 1 | <1 | <1 | <1 | <1 | 107 |
| 6 | 10 | 10 | 40 | 20 | 0.5 | 90 | 1 | 1 | 1 | 1 | 1 | 1 | <1 | <1 | <1 | <1 | 104 |

TABLE 1-continued

| Example | Chemical composition (ppm) | | | | | | | | | | | | | | | Electric capacitance (%) |
| --- | --- | --- | --- | --- | --- | --- | --- | --- | --- | --- | --- | --- | --- | --- | --- | --- |
| | Si | Fe | Cu | Zn | Pb | Er | V | B | Ti | Mn | Ga | Mg | Ca | In | Sn | Sb | |
| 7 | 10 | 10 | 40 | 20 | 0.5 | 1 | 50 | <1 | 1 | 1 | 1 | 1 | <1 | <1 | <1 | <1 | 106 |
| 8 | 10 | 10 | 40 | 20 | 0.5 | 1 | 70 | 1 | 1 | 1 | 1 | 1 | <1 | <1 | <1 | <1 | 108 |
| 9 | 10 | 10 | 40 | 20 | 0.5 | 1 | 90 | <1 | 1 | 1 | 1 | 1 | <1 | <1 | <1 | <1 | 103 |
| 10 | 10 | 10 | 40 | 20 | 0.5 | 30 | 30 | 1 | 1 | 1 | 1 | 1 | <1 | <1 | <1 | <1 | 107 |
| 11 | 30 | 10 | 40 | 20 | 0.5 | 50 | 1 | 1 | 1 | 1 | 1 | 1 | <1 | <1 | <1 | <1 | 105 |
| 12 | 10 | 30 | 40 | 20 | 0.5 | 50 | 1 | <1 | 1 | 1 | 1 | 1 | <1 | <1 | <1 | <1 | 104 |
| 13 | 10 | 10 | 80 | 20 | 0.5 | 50 | 1 | 1 | 1 | 1 | 1 | 1 | <1 | <1 | <1 | <1 | 107 |
| 14 | 10 | 10 | 120 | 20 | 0.5 | 50 | 1 | <1 | 1 | 1 | 1 | 1 | <1 | <1 | <1 | <1 | 104 |
| 15 | 10 | 10 | 40 | 10 | 0.5 | 50 | 1 | <1 | 1 | 1 | 1 | 1 | <1 | <1 | <1 | <1 | 104 |
| 16 | 10 | 10 | 40 | 40 | 0.5 | 50 | 1 | 1 | 1 | 1 | 1 | 1 | <1 | <1 | <1 | <1 | 107 |
| 17 | 10 | 10 | 40 | 70 | 0.5 | 50 | 1 | 1 | 1 | 1 | 1 | 1 | <1 | <1 | <1 | <1 | 105 |
| 18 | 10 | 10 | 40 | 20 | 0.2 | 50 | 1 | 1 | 1 | 1 | 1 | 1 | <1 | <1 | <1 | <1 | 104 |
| 19 | 10 | 10 | 40 | 20 | 1.0 | 50 | 1 | <1 | 1 | 1 | 1 | 1 | <1 | <1 | <1 | <1 | 108 |
| 20 | 10 | 10 | 40 | 20 | 3.0 | 50 | 1 | <1 | 1 | 1 | 1 | 1 | <1 | <1 | <1 | <1 | 104 |
| 21 | 10 | 10 | 40 | 20 | 0.5 | 50 | 1 | <1 | 5 | 1 | 1 | 1 | <1 | <1 | <1 | <1 | 107 |
| 22 | 10 | 10 | 40 | 20 | 0.5 | 50 | 1 | 1 | 10 | 1 | 1 | 1 | <1 | <1 | <1 | <1 | 109 |
| 23 | 10 | 10 | 40 | 20 | 0.5 | 50 | 1 | 1 | 20 | 1 | 1 | 1 | <1 | <1 | <1 | <1 | 108 |
| 24 | 10 | 10 | 40 | 20 | 0.5 | 50 | 1 | 1 | 30 | 1 | 1 | 1 | <1 | <1 | <1 | <1 | 106 |
| 25 | 10 | 10 | 40 | 20 | 0.5 | 50 | 1 | 1 | <1 | 20 | 1 | 1 | <1 | <1 | <1 | <1 | 110 |
| 26 | 10 | 10 | 40 | 20 | 0.5 | 50 | 1 | 1 | <1 | 1 | 30 | 1 | <1 | <1 | <1 | <1 | 111 |
| 27 | 10 | 10 | 40 | 20 | 0.5 | 50 | 1 | 1 | <1 | 1 | 1 | 30 | <1 | <1 | <1 | <1 | 109 |
| 28 | 10 | 10 | 40 | 20 | 0.5 | 50 | 1 | 1 | <1 | 1 | 1 | 1 | 10 | <1 | <1 | <1 | 109 |
| 29 | 10 | 10 | 40 | 20 | 0.5 | 50 | 1 | 1 | <1 | 1 | 1 | 1 | <1 | 3.0 | <1 | <1 | 111 |
| 30 | 10 | 10 | 40 | 20 | 0.5 | 50 | 1 | 1 | <1 | 1 | 1 | 1 | <1 | <1 | 10 | <1 | 111 |
| 31 | 10 | 10 | 40 | 20 | 0.5 | 50 | 1 | 1 | <1 | 1 | 1 | 1 | <1 | <1 | <1 | 10 | 110 |

TABLE 2

| Comparative Example | Chemical composition (ppm) | | | | | | | | | | | | | | | Electric capacitance (%) |
| --- | --- | --- | --- | --- | --- | --- | --- | --- | --- | --- | --- | --- | --- | --- | --- | --- |
| | Si | Fe | Cu | Zn | Pb | Zr | V | S | Ti | Mn | Ga | Mg | Ca | In | Sn | Sb | |
| 1 | 10 | 10 | 40 | 1 | 0.5 | 1 | 1 | 3 | <1 | 1 | 1 | 1 | <1 | <1 | <1 | <1 | 100 |
| 2 | 10 | 10 | 40 | 1 | 0.5 | 50 | 1 | 3 | <1 | 1 | 1 | 1 | <1 | <1 | <1 | <1 | 99 |
| 3 | 10 | 10 | 40 | 20 | 0.5 | 50 | 1 | 5 | <1 | 1 | 1 | 1 | <1 | <1 | <1 | <1 | 98 |
| 4 | 10 | 10 | 40 | 20 | 0.5 | 5 | 1 | 1 | <1 | 1 | 1 | 1 | <1 | <1 | <1 | <1 | 100 |
| 5 | 10 | 10 | 40 | 20 | 0.5 | 110 | 1 | 1 | <1 | 1 | 1 | 1 | <1 | <1 | <1 | <1 | 99 |

From the results shown in Tables 1 to 2, it is confirmed that the controlling of chemical compositions of the foil increases the surface expansion ratio and therefore high electric capacitance can be obtained.

INDUSTRIAL APPLICABILITY

As mentioned above, the aluminum material for electrolytic capacitor electrodes and the aluminum foil for electrolytic capacitor electrodes manufactured by the method of the present invention have high electric capacitance due to the increased surface expansion ratio. Therefore, they are preferably used as electrode material for electrolytic capacitor for use in electrical and electric equipments, especially miniaturized electronics equipments.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims. It should be recognized that the present invention permits any design-change, unless it deviates from the soul, if it is within the limits by which the claim was performed.

What is claimed is:

1. An aluminum material for electrolytic capacitor electrodes, said aluminum material whose aluminum purity is 99.9% or more consisting of:

Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein a total content of said at least one of Zr and V is 11 to 100 ppm; and
the balance being Al and impurities,
wherein a content of B is controlled to be 2 ppm or less.

2. The aluminum material for electrolytic capacitor electrodes as recited in claim 1,
wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of the at least one of Zr and V is 20 ppm or more, the total content of the at least one of Zr and V is 20 to 70 ppm, and
wherein the B content is 1 ppm or less.

3. An aluminum material for electrolytic capacitor electrodes, said aluminum material whose aluminum purity is 99.9% or more consisting of:

Si: 2 to 50 ppm;
Fe: 2 to 50 ppm;
Cu: 15 to 150 ppm;

Zn: 1 to 80 ppm;

Pb: 0.1 to 3 ppm;

at least one of Zr and V is 11 ppm or more, wherein a total content of said at least one of Zr and V is 11 to 100 ppm;

Ti: 1 to 30 ppm; and the balance being Al and impurities, wherein a content of B is controlled to be 2 ppm or less.

4. The aluminum material for electrolytic capacitor electrodes as recited in claim 3, wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more, a total content of said at least one of Zr and V is 20 to 70 ppm, and wherein the B content is 1 ppm or less.

5. The aluminum material for electrolytic capacitor electrodes as recited in claim 3, wherein the Ti content is 5 to 20 ppm.

6. An aluminum material for electrolytic capacitor electrodes, said aluminum material whose aluminum purity is 99.9% or more consisting of:

Si: 2 to 50 ppm;

Fe: 2 to 50 ppm;

Cu: 15 to 150 ppm;

Zn: 1 to 80 ppm;

Pb: 0.1 to 3 ppm;

at least one of Zr and V is 11 ppm or more, wherein a total content of at least one of Zr and V is 11 to 100 ppm;

at least one of Mn, Ga, Mg and Ca is 1 ppm or more, wherein a total content of said at least one of Mn, Ga, Mg and Ca is 1 to 50 ppm; and the balance being Al and impurities, wherein a content of B is controlled to be 2 ppm or less.

7. The aluminum material for electrolytic capacitor electrodes as recited in claim 6, wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more, the total content of said at least one of Zr and V is 20 to 70 ppm, and the B content is 1 ppm or less.

8. The aluminum material for electrolytic capacitor electrodes as recited in claim 6, wherein the content of said at least one of Mn, Ga, Mg and Ca is 3 ppm or more and the total content of said at least one of Mn, Ga, Mg and Ca is 3 to 30 ppm.

9. An aluminum material for electrolytic capacitor electrodes, said aluminum material whose aluminum purity is 99.9% or more consisting of:

Si: 2 to 50 ppm;

Fe: 2 to 50 ppm;

Cu: 15 to 150 ppm;

Zn: 1 to 80 ppm;

Pb: 0.1 to 3 ppm;

at least one of Zr and V: 11 ppm or more, wherein a total content of said at least one of Zr and V is 11 to 100 ppm;

at least one of In, Sn and Sb: 1 ppm or more, wherein the total content of said at least one of In, Sn and Sb is 1 to 30 ppm; and the balance being Al and impurities, wherein a content of B is controlled to be 2 ppm or less.

10. The aluminum material for electrolytic capacitor electrodes as recited in claim 9, wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more and the total content of said at least one of Zr and V is 20 to 70 ppm, and wherein the B content is 1 ppm or less.

11. The aluminum material for electrolytic capacitor electrodes as recited in claim 9, wherein the content of the at least one of In, Sn and Sb is 2 ppm or more and the total content of said at least one of In, Sn and Sb is 2 to 15 ppm.

12. An aluminum material for electrolytic capacitor electrodes, said aluminum material whose aluminum purity is 99.9% or more consisting of:

Si: 2 to 50 ppm;

Fe: 2 to 50 ppm;

Cu: 15 to 150 ppm;

Zn: 1 to 80 ppm;

Pb: 0.1 to 3 ppm;

at least one of Zr and V: 11 ppm or more, wherein a total content of said at least one of Zr and V is 11 to 100 ppm;

Ti: 1 to 30 ppm;

at least one of Mn, Ga, Mg and Ca: 1 ppm or more, wherein a total content of said at least one of Mn, Ga, Mg and Ca is 1 to 50 ppm; and the balance being Al and impurities, wherein a content of B is controlled to be 2 ppm or less.

13. The aluminum material for electrolytic capacitor electrodes as recited in claim 12, wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more, the total content of said at least one of Zr and V is 20 to 70 ppm, and wherein the B content B is 1 ppm or less.

14. The aluminum material for electrolytic capacitor electrodes as recited in claim 12, wherein the Ti content is 5 to 20 ppm.

15. The aluminum material for electrolytic capacitor electrodes as recited in claim 12, wherein the content of said at least one of Mn, Ga, Mg and Ca is 3 ppm or more and the total content of said at least one of Mn, Ga, Mg and Ca is 3 to 30 ppm.

16. The aluminum material for electrolytic capacitor electrodes as recited in claim 12, wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more, the total content of said at least one of Zr and V is 20 to 70 ppm, wherein the content of Ti is 5 to 20 ppm, wherein the content of said at least one of Mn, Ga, Mg and Ca is 3 ppm or more, a total content of said at least one of Mn, Ga, Mg and Ca is 3 to 30 ppm, and wherein the B content is 1 ppm or less.

17. An aluminum material for electrolytic capacitor electrodes, said aluminum material whose aluminum purity is 99.9$ or more consisting of:

Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein a total content of said at least one of Zr and V is 11 to 100 ppm;
Ti: 1 to 30 ppm;
at least one of In, Sn and Sb: 1 ppm or more, wherein a total content of said at least one of In, Sn and Sb is 1 to 30 ppm; and
the balance being Al and impurities,
wherein a content of B is controlled to be 2 ppm or less.

18. The aluminum material for electrolytic capacitor electrodes as recited in claim 17,
wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more, the total content of said at least one of Zr and V is 20 to 70 ppm, and
wherein the B content is 1 ppm or less.

19. The aluminum material for electrolytic capacitor electrodes as recited in claim 12, wherein the content of Ti is 5 to 20 ppm.

20. The aluminum material for electrolytic capacitor electrodes as recited in claim 17, wherein the content of said at least one of In, Sn and Sb is 2 ppm or more and the total content of said at least one of In, Sn and Sb is 2 to 15 ppm.

21. The aluminum material for electrolytic capacitor electrodes as recited in claim 17,
wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more, the total content of said at least one of Zr and V is 20 to 70 ppm,
wherein the Ti content is 5 to 20 ppm,
wherein the content of said at least one of In, Sn and Sb is 2 ppm or more,
wherein a total content of said at least one of In, Sn and Sb is 2 to 15 ppm, and
wherein the B content is 1 ppm or less.

22. An aluminum material for electrolytic capacitor electrodes, said aluminum material whose aluminum purity is 99.9% or more consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein a total content of said at least one of Zr and V is 11 to 100 ppm;
at least one of Mn, Ga, Mg and Ca: 1 ppm or more, wherein the total content of said at least one of Mn, Ga, Mg and Ca is 1 to 50 ppm;
at least one of In, Sn and Sb: 1 ppm or more, wherein a total content of said at least one of In, Sn and Sb is 1 to 30 ppm; and
the balance being Al and impurities,
wherein a content of B is controlled to be 2 ppm or less.

23. The aluminum material for electrolytic capacitor electrodes as recited in claim 22,
wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more, a total content of said at least one of Zr and V is 20 to 70 ppm, and
wherein the B content is 1 ppm or less.

24. The aluminum material for electrolytic capacitor electrodes as recited in claim 22, wherein the content of at least one of Mn, Ca, Mg and Ca is 3 ppm or more, and a total content of said at least one of Mn, Ga, Mg and Ca is 3 to 30 ppm.

25. The aluminum material for electrolytic capacitor electrodes as recited in claim 22, wherein the content of at least one of In, Sn and Sb is 2 ppm or more, and the total content of said at least one of In, Sn and Sb is 2 to 15 ppm.

26. The aluminum material for electrolytic capacitor electrodes as recited in claim 22,
wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more and the total content of said at least one of Zr and V is 20 to 70 ppm,
wherein a content of said at least one of Mn, Ga, Mg and Ca is 3 ppm or more, and a total content of said at least one of Mn, Ga, Mg and Ca is 3 to 30 ppm,
wherein a content of said at least one of In, Sn and Sb is 2 ppm or more, and a total content of said at least one of In, Sn and Sb is 2 to 15 ppm, and
wherein the B content is 1 ppm or less.

27. An aluminum material for electrolytic capacitor electrodes, said aluminum material whose aluminum purity is 99.9% or more consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein a total content of said at least one of Zr and V is 11 to 100 ppm;
Ti: 1 to 30 ppm;
at least one of Mn, Ga, Mg and Ca: 1 ppm or more, wherein the total content of said at least one of Mn, Ga, Mg and Ca is 11 to 50 ppm;
at least one of In, Sn and Sb: 1 ppm or more, wherein the total content of said at least one of In, Sn and Sb is 1 to 30 ppm; and
the balance being Al and impurities,
wherein a content of B is controlled to be 2 ppm or less.

28. The aluminum material for electrolytic capacitor electrodes as recited in claim 27,
wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more, the total content of said at least one of Zr and V is 20 to 70 ppm, and
wherein the B content is 1 ppm or less.

29. The aluminum material for electrolytic capacitor electrodes as recited in claim 27, wherein the Ti content is 5 to 20 ppm.

30. The aluminum material for electrolytic capacitor electrodes as recited in claim 27, wherein the content of at least one of Mn, Ga, Mg and Ca is 3 ppm or more and a total content of said at least one of Mn, Ga, Mg and Ca is 3 to 30 ppm.

31. The aluminum material for electrolytic capacitor electrodes as recited in claim 27, wherein the content of at least one of In, Sn and Sb is 2 ppm or more and a total content of said at least one of In, Sn and Sb is 2 to 15 ppm.

32. The aluminum material for electrolytic capacitor electrodes as recited in claim 27,
wherein the Ti content is 5 to 20 ppm, and
wherein the content of at least one of Mn, Ga, Mg and Ca is 3 ppm or more and a total content of said at least one of Mn, Ga, Mg and Ca is 3 to 30 ppm.

33. The aluminum material for electrolytic capacitor electrodes as recited in claim 27,
wherein the Ti content is 5 to 20 ppm, and
wherein the content of said at least one of In, Sn and Sb is 2 ppm or more and a total content of said at least one of In, Sn and Sb is 2 to 15 ppm.

34. The aluminum material for electrolytic capacitor electrodes as recited in claim 27,
wherein the content of said at least one of Mn, Ga, Mg and Ca is 3 ppm or more and a total content of said at least one of Mn, Ga, Mg and Ca is 3 to 30 ppm, and
wherein the content of said at least one of In, Sn and Sb is 2 ppm or more and a total content of said at least one of In, Sn and Sb is 2 to 15 ppm.

35. The aluminum material for electrolytic capacitor electrodes as recited in claim 27,
wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more, a total content of said at least one of Zr and V is 20 to 70 ppm,
wherein the content of Ti is 5 to 20 ppm,
wherein the content of at least one of Mn, Ga, Mg and Ca is 3 ppm or more, the total content of said at least one of Mn, Ga, Mg and Ca is 3 to 30 ppm, and
wherein the B content is 1 ppm or less.

36. The aluminum material for electrolytic capacitor electrodes as recited in claim 27,
wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more, the total content of said at least one of Zr and V is 20 to 70 ppm,
wherein the Ti content is 5 to 20 ppm,
wherein the content of said at least one of In, Sn and Sb is 2 ppm or more, a total content of said at least one of In, Sn and Sb is 2 to 15 ppm, and
wherein the B content is 1 ppm or less.

37. The aluminum material for electrolytic capacitor electrodes as recited in claim 27,
wherein the Ti content is 5 to 20 ppm, the content of at least said one of Mn, Ga, Mg and Ca is 3 ppm or more, and a total content of said at least one of Mn, Ga, Mg and Ca is 3 to 30 ppm, and
wherein the content of said at least one of In, Sn and Sb is 2 ppm or more and a total content of said at least one of In, Sn and Sb is 2 to 15 ppm.

38. The aluminum material for electrolytic capacitor electrodes as recited in claim 27,
wherein the Si content is 5 to 20 ppm, the Fe content is 5 to 20 ppm, the Cu content is 30 to 100 ppm, the Zn content is 10 to 50 ppm, the Pb content is 0.3 to 2 ppm, the content of said at least one of Zr and V is 20 ppm or more, a total content of said at least one of Zr and V is 20 to 70 ppm,
wherein the Ti content is 5 to 20 ppm,
wherein the content of at least one of Mn, Ga, Mg and Ca is 3 ppm or more, a total content of said at least one of Mn, Ga, Mg and Ca is 3 to 30 ppm,
wherein the content of said at least one of In, Sn and Sb is 2 ppm or more, a total content of said at least one of In, Sn and Sb is 2 to 15 ppm, and
wherein the B content is 1 ppm or less.

39. A method for manufacturing an aluminum foil for electrolytic capacitor electrodes, comprising the steps of:
rolling an aluminum material into a foil; and
performing final annealing of the foil at the temperature of 430 to 580° C.,
wherein the aluminum material has an aluminum purity of 99.9% or more and consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein a total content of said at least one of Zr and V is 11 to 100 ppm; and
the balance being Al and impurities,
wherein a content of B is controlled to be 2 ppm or less.

40. A method for manufacturing an aluminum foil for electrolytic capacitor electrodes, comprising the steps of:
rolling an aluminum material into a foil; and thereafter
performing final annealing of the foil at the temperature of 430 to 580° C.,
wherein the aluminum material has an aluminum purity of 99.9% or more and consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein the total content of said at least one of Zr and V is 11 to 100 ppm;
Ti: 1 to 30 ppm; and
the balance being Al and impurities,
wherein a content of B is controlled to be 2 ppm or less.

41. A method for manufacturing an aluminum foil for electrolytic capacitor electrodes, comprising the steps of:
rolling an aluminum material into a foil; and thereafter
performing final annealing of the foil at the temperature of 430 to 580° C.,
wherein the aluminum material has an aluminum purity of 99.9% or more and consisting of:
Si: 2 to 50 ppm;
Fe: 2 to 50 ppm;
Cu: 15 to 150 ppm;
Zn: 1 to 80 ppm;

Pb: 0.1 to 3 ppm;
at least one of Zr and V: 11 ppm or more, wherein the total content of said at least one of Zr and V is 11 to 100 ppm;
at least one of Mn, Ga, Mg and Ca: 1 ppm or more, wherein the total content of said at least one of Mn, Ga, Mg and Ca is 1 to 50 ppm; and
the balance being Al and impurities,
wherein a content of B is controlled to be 2 ppm or less.

42. A method for manufacturing an aluminum foil for electrolytic capacitor electrodes, comprising the steps of:
rolling an aluminum material into a foil; and thereafter
performing final annealing of the foil at the temperature of 430 to 580° C.,
wherein the aluminum material has an aluminum purity of 99.9% or more and consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein the total content of said at least one of Zr and V is 11 to 100 ppm;
at least one of In, Sn and Sb: 1 ppm or more, wherein the total content of said at least one of In, Sn and Sb is 1 to 30 ppm; and
the balance being Al and impurities,
wherein a content of B is controlled to be 2 ppm or less.

43. A method for manufacturing an aluminum foil for electrolytic capacitor electrodes, comprising the steps of:
rolling an aluminum material into a foil; and thereafter
performing final annealing of the foil at the temperature of 430 to 580° C.,
wherein the aluminum material has an aluminum purity of 99.9% or more and consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein the total content of said at least one of Zr and V is 11 to 100 ppm;
Ti: 1 to 30 ppm;
at least one of Mn, Ga, Mg and Ca: 1 ppm or more, wherein a total content of said at least one of Mn, Ga, Mg and Ca is 1 to 50 ppm; and
the balance being Al and impurities,
wherein a content of B is controlled to be 2 ppm or less.

44. A method for manufacturing an aluminum foil for electrolytic capacitor electrodes, comprising the steps of:
rolling an aluminum material into a foil; and thereafter
performing final annealing of the foil at the temperature of 430 to 580° C.,
wherein the aluminum material has an aluminum purity of 99.9% or more and consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V; 11 ppm or more, wherein the total content of said at least one of Zr and V is 11 to 100 ppm;
Ti: 1 to 30 ppm;
at least one of In, Sn and Sb: 1 ppm or more, wherein the total content of said at least one of In, Sn and Sb is 1 to 30 ppm; and
the balance being Al and impurities,
wherein a content of B is controlled to be 2 ppm or less.

45. A method for manufacturing an aluminum foil for electrolytic capacitor electrodes, comprising the steps of:
rolling an aluminum material into a foil; and thereafter
performing final annealing of the foil at the temperature of 430 to 580° C.,
wherein the aluminum material has an aluminum purity of 99.9% or more and consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein the total content of said at least one of Zr and V is 11 to 100 ppm;
at least one of Mn, Ga, Mg and Ca: 1 ppm or more, wherein a total content of said at least one of Mn, Ga, Mg and Ca is 11 to 50 ppm;
at least one of In, Sn and Sb: 1 ppm or more, wherein a total content of said at least one of In, Sn and Sb is 1 to 30 ppm; and
the balance being Al and impurities;
wherein a content of B is controlled to be 2 ppm or less.

46. A method for manufacturing an aluminum foil for electrolytic capacitor electrodes, comprising the steps of:
rolling an aluminum material into a foil; and thereafter
performing final annealing of the foil at the temperature of 430 to 580° C.,
wherein the aluminum material has an aluminum purity of 99.9% or more and consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein a total content of said at least one of Zr and V is 11 to 100 ppm;
Ti: 1 to 30 ppm;
at least one of Mn, Ga, Mg and Ca: 1 ppm or more, wherein a total content of said at least one of Mn, Ga, Mg and Ca is 11 to 50 ppm;
at least one of In, Sn and Sb: 1 ppm or more, wherein a total content of said at least one of In, Sn and Sb is 1 to 30 ppm; and
the balance being Al and impurities,
wherein a content of B is controlled to be 2 ppm or less.

47. An electrolytic capacitor including at least one of an anode or a cathode made of an aluminum foil, wherein the aluminum foil is made of an aluminum material whose aluminum purity is 99.9% or more, the aluminum material consisting of:

Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein a total content of said at least one of Zr and V is 11 to 100 ppm; and
the balance being Al and impurities,
wherein a content of B is controlled to be 2 ppm or less.

48. An electrolytic capacitor including at least one of an anode or a cathode made of an aluminum foil, wherein the aluminum foil is made of an aluminum material whose aluminum purity is 99.9% or more, the aluminum material consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein the total content of said at least one of Zr and V is 11 to 100 ppm;
Ti: 1 to 30 ppm; and
the balance being Al and impurities,
wherein a content of B is controlled to be 2 ppm or less.

49. An electrolytic capacitor including at least one of an anode or a cathode made of an aluminum foil, wherein the aluminum foil is made of an aluminum material whose aluminum purity is 99.9% or more, the aluminum material consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein the total content of said at least one of Zr and V is 11 to 100 ppm;
at least one of Mn, Ga, Mg and Ca: 1 ppm or more, wherein the total content of said at least one of Mn, Ga, Mg and Ca is 1 to 50 ppm; and
the balance being Al and impurities,
wherein a content of B is controlled to be 2 ppm or less.

50. An electrolytic capacitor including at least one of an anode or a cathode made of an aluminum foil, wherein the aluminum foil is made of an aluminum material whose aluminum purity is 99.9% or more, the aluminum material consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein a total content of said at least one of Zr and V is 11 to 100 ppm;
at least one of In, Sn and Sb: 1 ppm or more, wherein a total content of said at least one of In, Sn and Sb is 1 to 30 ppm; and
the balance being Al and impurities,
wherein a content of B is controlled to be 2 ppm or less.

51. An electrolytic capacitor including at least one of an anode or a cathode made of an aluminum foil, wherein the aluminum foil is made of an aluminum material whose aluminum purity is 99.9% or more, the aluminum material consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein a total content of said at least one of Zr and V is 11 to 100 ppm;
Ti: 1 to 30 ppm;
at least one of Mn, Ga, Mg and Ca: 1 ppm or more, wherein a total content of said at least one of Mn, Ga, Mg and Ca is 1 to 50 ppm; and
the balance being Al and impurities,
wherein a content of B is controlled to be 2 ppm or less.

52. An electrolytic capacitor including at least one of an anode or a cathode made of an aluminum foil, wherein the aluminum foil is made of an aluminum material whose aluminum purity is 99.9% or more, the aluminum material consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein a total content of said at least one of Zr and V is 11 to 100 ppm;
Ti: 1 to 30 ppm;
at least one of In, Sn and Sb: 1 ppm or more, wherein a total content of said at least one of In, Sn and Sb is 1 to 30 ppm; and
the balance being Al and impurities,
wherein a content of B is controlled to be 2 ppm or less.

53. An electrolytic capacitor including at least one of an anode or a cathode made of an aluminum foil, wherein the aluminum foil is made of an aluminum material whose aluminum purity is 99.9% or more, the aluminum material consisting of:
Si: 2 to 50 ppm;
Fe: 2 to 50 ppm;
Cu: 15 to 150 ppm;
Zn: 1 to 80 ppm;
Pb: 0.1 to 3 ppm;
at least one of Zr and V: 11 ppm or more, wherein a total content of said at least one of Zr and V is 11 to 100 ppm;
at least one of Mn, Ga, Mg and Ca: 1 ppm or more, wherein a total content of said at least one of Mn, Ga, Mg and Ca is 11 to 50 ppm;
at least one of In, Sn and Sb: 1 ppm or more, wherein a total content of said at least one of In, Sn and Sb is 1 to 30 ppm; and
the balance being Al and impurities,
wherein a content of B is controlled to be 2 ppm or less.

54. An electrolytic capacitor including at least one of an anode or a cathode made of an aluminum foil, wherein the aluminum foil is made of an aluminum material whose aluminum purity is 99.9% or more, the aluminum material consisting of:

Si: 2 to 50 ppm;

Fe: 2 to 50 ppm;

Cu: 15 to 150 ppm;

Zn: 1 to 80 ppm;

Pb: 0.1 to 3 ppm;

at least one of Zr and V: 11 ppm or more, wherein a total content of said at least one of Zr and V is 11 to 100 ppm;

Ti: 1 to 30 ppm;

at least one of Mn, Ga, Mg and Ca: 1 ppm or more, wherein a total content of said at least one of Mn, Ga, Mg and Ca is 11 to 50 ppm;

at least one of In, Sn and Sb: 1 ppm or more, wherein a total content of said at least one of In, Sn and Sb is 1 to 30 ppm; and the balance being Al and impurities, wherein a content of B is controlled to be 2 ppm or less.

* * * * *

UNITED STATES PATENT AND TRADEMARK OFFICE
CERTIFICATE OF CORRECTION

PATENT NO. : 6,876,541 B1
DATED : April 5, 2005
INVENTOR(S) : Taro Kato et al.

It is certified that error appears in the above-identified patent and that said Letters Patent is hereby corrected as shown below:

Column 12,
Line 67, please change "99.9$" to -- 99.9% --.

Signed and Sealed this

Thirtieth Day of August, 2005

JON W. DUDAS
*Director of the United States Patent and Trademark Office*